Patented Sept. 8, 1942

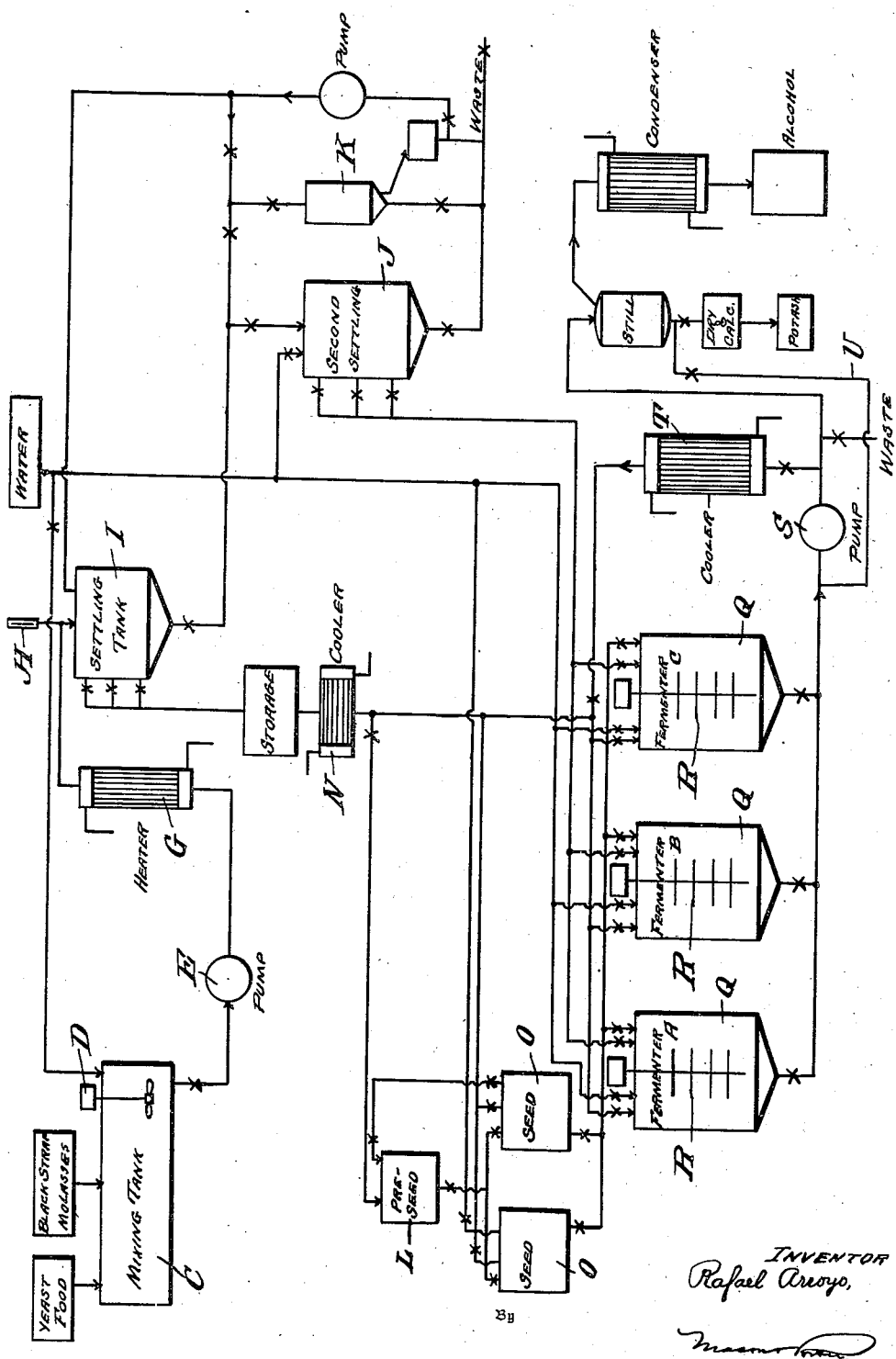

2,295,150

UNITED STATES PATENT OFFICE 2,295,150

ETHANOL FERMENTATION OF BLACKSTRAP MOLASSES

Rafael Arroyo, Rio Piedras, P. R.

Application November 28, 1941, Serial No. 420,898

10 Claims. (Cl. 195—37)

The present invention relates to improvements in the art of ethanol fermentation of blackstrap molasses in the production of alcohol and rum.

Blackstrap molasses as a raw material for alcohol and rum production is a substance of variable composition. Molasses from different countries vary a great deal in physical and chemical characteristics, and even that produced within a single country or locality will exhibit variations due to the cane variety from which the blackstrap was produced, the cultivation methods followed at the plantation, variations in physical and chemical characteristics of the soils, the methods of sugar manufacture employed at the particular factory, and the quality of marketable sugar produced. Some of these differences in the constitution of molasses bear a direct influence on the suitability of the blackstrap for rum and alcoholic fermentation. In extreme cases (as for instance Hawaiian blackstrap molasses) the unsatisfactory composition of the raw material has prevented the development of a profitable alcohol and rum industry in the producing country, although much time and labor has been devoted to a study of the situation by both business men and scientific investigators.

Among the most important shortcomings of blackstrap molasses from the standpoint of their fitness for rum and alcoholic fermentation may be mentioned: (1) low total sugars; (2) high total non-sugars; (3) high ash; (4) high gums; (5) deficiency in yeast nutriments, especially as to nitrogen and less frequently as to phosphoric acid; (6) variable degrees of microbiological contamination in the form of various bacteria, wild yeasts and moulds. The presence of the high non-sugar ash and gum constituents has heretofore made it necessary to employ relatively high dilutions, thereby further augmenting the deleterious effects of low total sugars and nutriment deficiency.

It has long been recognized by alcohol and rum producers, as well as by fermentation experts and research workers, that the desired improvements in rum and alcoholic fermentations comprise higher economy in production of alcohol and rum; higher purity and increased value of byproducts; higher alcoholic concentration in the fermented mash; higher yields and fermentation efficiencies, etc.

One of the objects of the present invention is to take account of the natural deficiencies of blackstrap molasses and in large measure to correct them; and therewith in a practical and inexpensive way to increase the alcoholic concentration of the fermented mash, to raise the alcoholic yields based on total sugars content of the substrate, and greatly to improve the fermentation and over-all efficiencies in the distillery.

The first desideratum, that is, that comprising the favorable changes in the chemical composition of the raw material, is accomplished by the preparation of a purified and conditioned "thick mash," which is conditioned and purified through: (1) a great reduction in the ash content of the molasses; (2) a similar reduction in the total non-sugars of the molasses; (3) a reduction in gums and other organic non-sugars; (4) an increase in total sugars concentration in the molasses due to removal of non-sugars; (5) correction of pH value and yeast nutriment deficiencies; and (6) elimination of all vegetative forms of microbiological contamination.

The second desideratum, that is, that pertaining to increases of alcoholic concentrations in the fermented mashes, increased yields and fermentation efficiencies and cost savings, is obtained through the use of the conditioned and purified "thick mash" mentioned above, in a special fermentation procedure, whose main feature depends on the incremental feeding of a conditioned thick mash to the fermenters.

This improved process, as described hereinafter, has no reference to any special yeast strain for its operation. Any of the many good distillery or rum yeasts now in use commercially may be employed with this improved method of rum and alcoholic fermentation.

A feature of the invention, therefore, is the production of a thick mash which is conditioned and purified to eliminate substantial parts of the undesirable substances and organisms present, under economical conditions of handling; and to effect the fermentation by the employment of successive portions of the conditioned thick mash.

An illustrative manner of practicing the invention with a blackstrap molasses of the type described in Table I may be set out as follows:

The process starts with the weighing of the molasses and water to be employed in the preparation of the "thick mash." Then for each part by weight of blackstrap molasses are added also by weight:

|  | Per cent |
|---|---|
| Water | 42.75 |
| Ammonium sulphate | 0.50 |
| Calcium superphosphate | 0.08 |
| Concentrated sulphuric acid | 0.50 |

Commercial grades of all chemicals involved are used. The ammonium sulphate and calcium superphosphate may be of the same quality used as fertilizing material.

The accompanying drawing conventionally illustrates an apparatus assembly for practicing the invention.

After thorough mixing of these ingredients in the mixer tank C, a "thick mash" of about 60 degrees Brix, and with a pH value about 0.5 lower than that of the original molasses, results: the degree Brix varying somewhat, of course, according to the initial Brix of the blackstrap molasses used.

This "thick mash" is then pumped through a multitubular steam heater G where its temperature is raised to exactly 80 degrees C. Great care must be exercised at this point to prevent overheating of the "thick mash." To facilitate the temperature control, a variable speed electric pump E is used to force the liquid through the heater G, and the heater is provided with necessary regulating standard centigrade thermometers H. While the "thick mash" is being pumped through the heater G it must be kept well stirred up so as to avoid the leaving of precipitated impurities at the bottom of the thick mashing tank C. For this purpose the thick mashing tank is provided with a device for agitation, such as a motor-driven mechanical stirrer D.

From the steam heater the "thick mash" is discharged into the thick mash receiving and settling tank I. This tank is a cylindrical iron tank preferably insulated for the conservation of heat and having a conical bottom. The conical bottom should have a capacity equal to about 20% of the total volume of "thick mash."

In this tank the "thick mash" is stored hot and allowed to settle for at least 6 hours. The temperature employed results in the pasteurization or the destruction by autolysis of organisms such as bacteria, wild yeasts, and molds, which are contained in the original blackstrap molasses, so that essentially a sterile thick mash is provided in the supernatant liquid: and at the same time, the sucrose of the total sugars is permitted to reach a substantial degree of inversion, so that the total sugars are high in fermentable carbohydrates.

The precipitated organic and inorganic impurities settle down into the conical bottom of the tank mixed with some of the "thick mash," thus forming a sort of magma, or semifluid mass. This sedimentation is disposed of at this point in either or both of two ways:

(1) The sediment may be dropped into a tank J situated underneath the thick mash receiving and settling tank I, where it is diluted with water, for example with two or three times the volume thereof, and well stirred up. This further dilution permits a quick sedimentation: but it will be noted that the quantity of water necessary for this dilution reduces the sugar content below an economic condition for direct fermentation. However, the solid impurities will rapidly settle at the bottom of this tank leaving the clean sweet water above. This sweet water is then used in the preparation of the "thin mash" at the fermenters. The solid impurities are washed out into the sewer or otherwise disposed of.

(2) The sediment may be fed directly to a supercentrifuge that will separate the solid impurities from the material, returning the clear run-off to the thick mash receiving and settling tank I. Alternatively, a centrifugal separation may be effected of the secondary deposit from the sweet water just described, to obtain a maximum amount of the valuable sugars.

The conditioned and purified "thick mash" in the tank I is now ready for fermentation employment. Immediately before using, the "thick mash" is passed through a heat exchanger or cooler N to bring its temperature down to 40 degrees C. or below. This thick mash cooler is connected directly to the yeasting section L, the seed tanks O, and the main fermenters Q, for supplying all of them with "thick mash" for preparation of "thin mash."

The actual fermentation is preferably carried on in the following manner:

The fermenters Q are of the closed type and preferably constructed of polished iron. They are equipped with mechanical stirrers R or other devices for effecting agitation, and with recording thermometers. They are also connected to a circulating pump S that draws the fermenting liquid from a point near the bottom of the fermenter and circulates it through a cooler T, delivering the cooled mash at the top of the fermenter. The cooler is situated outside the fermenters, and one such cooler T can take care of three or more fermenters Q. This device is used to lower the temperature of the fermenting liquid whenever it becomes necessary. Fermentation temperatures are thus rigorously controlled between 28 degrees C. and 30 degrees C.

The first step in the preparation of the "thin mash" at the fermenter is to introduce into the fermenter all of the water that is to be used as such for the fermentation operation. Then one-half of the total amount of "thick mash" to be used is added gradually, with continuous stirring, to insure thorough mixing. In this way an initial thin mash is prepared within the fermenter, having a Brix density varying between 20 degrees and 24 degrees. The pH is adjusted if necessary, and the mash is then inoculated with a footing or seed equivalent to from 10 per cent to 15 per cent the volume of total "thin mash" to be made. Gentle stirring of the fermenter contents is maintained while the yeast seeding is being incorporated.

Twelve hours after fermentation has started, another increment of "thick mash" is passed into the fermenter, taking care to keep the liquid within the fermenter in motion while the new increment is being added. The amount of "thick mash" added this time may amount to 0.3 of the total "thick mash" to be added to the fermenter. Any pH adjustment necessary may be accomplished at this time.

Fermentation is allowed to proceed during six more hours, and then the last increment of "thick mash" is incorporated to the fermenter, observing the same precautions as to thorough mixing. This last increment will amount in this illustrative example to 0.2 of the total "thick mash" to be added. Thus the total "thick mash" has been introduced by adding 0.5, then 0.3 and then 0.2 of the total; that is, during the first eighteen hours of fermentation all of the "thick mash" has been passed into the fermenter.

During the course of this fermentation, the acidity is maintained at substantially pH 5.0 to 5.2 by introduction of alkaline material as necessary to reduce the relative acidity produced through the fermentation action. The preferred agent for employment as alkaline material is 10 percent ammonia water, as it adds no ash to the mash, and in itself forms an excellent nitrogenous yeast nutriment. This capacity of alkalizing without increasing ash content is of particular value, when the residues are to be recovered and calcined to recover their potash content. Sodium and potassium carbonates may be employed as soluble alkalies for quickly effecting a change of acidity: and it is likewise feasible to introduce powdered chalk or other form of calcium carbonate as a regulating agent. Normally, such additions need only be made at the times of the introduction of the successive increments of the thick mash, which is a matter of great convenience.

From fifteen to thirty hours after addition of the last increment of "thick mash," fermentation will have finished in most cases.

The temperature is maintained between substantially 28 degrees C. and 30 degrees C. This fermentation temperature range has been found to be optimum for the successful building of the unusually high alcoholic concentrations in the fermented mash without impairing yields and high fermentation efficiencies.

The optimum density for the thick mash depends upon the characteristics of the blackstrap molasses employed and upon the considerations of volume, settling time required or permissible, the heat units required for heating, and the rate of precipitation of impurities. It has been found that employment of substantially from 37½ to 45 percent of water, in a formula such as that specified above, is successful with various types of equipment and with various qualities of molasses. The thick mash may have a density varying between 55 and 65 degrees Brix, in accordance with the original density Brix of the molasses, and the proportion of dilution water employed. The temperature of the mash, when heated for the purpose of accomplishing a sterilization along with the settling, may vary from substantially 65 to 80 degrees, while retaining the advantage of effecting destruction of organisms and without such a degree of heat-treatment of materials in the thick mash as to hinder proper sedimentation of impurities, or efficient fermentation of sugars.

The time required for settling depends upon the characteristics of the thick mash itself, and upon the conditions of delivering the supernatant liquor toward the fermentation vats. Thus, it is feasible to withdraw half of the contents of the sedimentation tank, in the above example, for making up the original fermentation mash, as soon as the level of sedimentation has dropped below the half-height of the vat by a sufficient amount to prevent withdrawing any of the sediment when the supernatant liquor is decanted; and then the further increments for introduction into this same vat may be successively withdrawn as needed, as sedimentation occurs at such a rate that the successive fractions become available within the stated time basis. Furthermore, it is feasible to utilize one or more sedimentation vats in association with a plurality of fermentation vessels, preparing the thick mash in advance so that the proper quantities of supernatant liquid can be withdrawn and delivered into these fermenters for the first, second, or third increments in the procedure described above, and if desired holding portions of the thick mash in a storage tank, at the sterilization temperature, for example, and thus making possible a greater through-put at the sedimentation phase.

The acidity for the thick mash depends on the acidity of the original molasses. The alteration in acidity should amount to about 0.5 pH, as one phase of the thick mashing operation is that of producing a change of equilibrium for the original constituents of the molasses that results in the precipitation of non-sugars. Thus, molasses usually has an original pH of 5.2 to 5.7, and this would be correspondingly reduced in thick mashing to pH values of substantially 4.7 to 5.2. The quantity of acid to be introduced can be determined as roughly that which will produce this shift of pH reading and which will effect an optimum sedimentation.

The stated concentration conditions in the thin mash are employed illustratively for the particular blackstrap molasses, but it will be understood that the number of increments and the proportions to be utilized for each increment may be varied in accordance with the analysis of the particular blackstrap molasses. The actual density of the thin mash utilized in the fermenters may be controlled at will, by adjusting the increments of the thick mash which is being delivered, both as to concentration produced in the mixer C and as to weight of the increment which is being introduced.

The thin mashes employed for fermentation should be set at an initial Brix density ranging from 18 degrees to 24 degrees, depending on the quality of the thick mash, and the characteristics of the yeast strain being used. The second portion of thick mash should be brought into the fermentation vat when the original Brix density has dropped to about 55 to 63 percent of the original value, and the quantity of this new increment should be less than that required to raise the Brix density reading to a value higher than that produced by introducing the preceding increment. It has been found that the time intervals between the addition of successive increments may be varied according to the molasses and the yeast strains being used, and it is presently preferred to introduce the thick mash in three successive portions, as this has been found to give a satisfactory efficiency with minimum operational difficulties.

Brixes and pH readings are taken at setting time, and then before and after the addition of a new increment of "thick mash."

To prevent excessive foaming of the fermenting mash when adding a new increment, it has been found convenient to add Turkey red oil in the proportion of one part oil to 16,000 parts of mash by volume, at setting time. Incidentally, the addition of this small quantity of Turkey red oil will raise the fermentation efficiency by at least one percent. This is due to the fact that the carbon dioxide gas formed within the liquid finds a more easy escape from the liquid surface in the fermenter, due to the foam breaking action of the Turkey red oil. Other non-toxic foam-breaking agents, having the characteristic of reducing the surface tension, may be substituted.

In the illustrative diagram, the thick mash may also be delivered to a pre-seeding tank L and to the seeding tanks O. Each of these tanks receives water to a desired concentration, and the pre-seeding tank L is seeded with a pure culture which is caused to propagate. The contents of this tank are then delivered through the conduits, under control of the illustrated valves, into the seed tanks O, in which the batch of seed is made up for delivery into a fermenter Q. In this way, a pure culture can be prepared for accomplishing the main fermentation.

Through this incremental method of fermentation, it becomes possible successfully to ferment very high concentrations of sugars per unit volume of mash. Although very high total sugars concentrations per unit volume of mash are used, the actual total sugars concentration at a given moment during the entire duration of fermentation never reaches inhibitory proportions, due to the incremental system employed in adding the "thick mash" to the fermenters. Some of the mashes fermented by this method, if tried by the usual processes, would have at a setting time Brix densities between 28 degrees and 32 degrees, and sugar concentration of from 18.0 to 22 grams per 100 millimeters of mash. Mashes of these densities and such high total sugars concentrations cannot be fermented by ordinary mashing and fermentation methods without impairing yields and fermentation efficiencies.

The contents of the fermenter can then be delivered to a still, usually with the inclusion of means for separating the slop. The slop may be discharged to waste, but preferably is dried and calcined, since the purifying operation has eliminated many of the normal ash constituents of blackstrap molasses, and a profitable recovery of the potash can be effected.

By employment of the pump S, it is likewise feasible to move a part of the contents of one fermenter into another, by way of "slopping back," and this operation is attended by superior results, as compared with prior practices, since the blackstrap molasses mash has been purified of many of the non-fermentable substances which restrict or inhibit this operation.

During the "thick mashing" chemical changes are effected which result in precipitation of non-sugars, by which the original chemical composition of the molasses is greatly improved and the material is thus converted into a much fitter raw material for rum and alcoholic fermentation. This precipitation of organic and inorganic impurities is effected during the preparation of the "thick mash" even before heat treatment is applied. The heat is applied to hasten the cleaning effect and also to intensify it to the utmost possible degree. It also provides for destruction of all vegetative microbiological agents in the raw materials. Although it is recommended to employ heat as described above, in localities where fuel is too expensive or difficult to obtain, the "thick mash" may be used in this process omitting the heat treatment with good results from the other phases of the operation, including the clarifying and eliminating action of the sediment upon micro-organisms in depositing.

Some of the more important improvements effected and advantages attained by this conditioning and purifying of the "thick mash" comprise:

(1) The total sugars concentration by weight of molasses is increased by from 3.00 to 5.00 per cent through withdrawal of impurities.

(2) The total non-sugars in the molasses are reduced by about 20.0 per cent.

(3) Molasses gums are reduced by at least 15 to 20 per cent of their former value.

(4) The soluble ash content of the raw material is reduced in the amount of 40 to 50 per cent of its original value.

(5) Deficiencies in nutrition elements necessary to the growth and metabolism of the yeast are corrected.

(6) The valuable part (as a recoverable by-product) of the molasses ashes, i. e., the potash, remains in the purified material, greatly enriched in concentration. An increased potash concentration in the ash of the treated material has been found to amount to from 35 to 45 per cent of the original content in the untreated blackstrap molasses ash. This fact is of great importance to those distilleries that recover the potash from the slops.

(7) The treated material is rendered free of all vegetative forms of micro-organisms by the heat treatment already described.

(8) Due to the improved chemical composition of the resulting slops, slopping back, if desired, may be practiced more intensively.

(9) The contents of the fermenter serve as an ever-increasing yeast footing to every new incremental addition of "thick mash." In this way each new addition of "thick mash" finds a larger number of yeast cells ready to attack the new sugars coming in. This also helps towards obtaining high yields, quick fermentations and high efficiencies.

(10) The use of a conditioned "thick mash" added by increments makes it possible efficiently to reach the high total concentration of sugars necessary for the production of very high alcoholic concentration in the fermented mashes, without having initially a high non-sugars concentration that would inhibit the action of the yeast cells, as by this process the non-sugars concentration at initial setting time is low and increases only very slowly.

(11) Danger of infection is greatly lessened due (a) to the sterilized condition of the "thick mash"; and (b) to the building of unusually high alcoholic concentrations in the fermenting medium.

(12) Fermented mashes containing from 9 to 11.5 per cent alcohol by volume may be readily obtained in a reasonable length of time.

(13) For a given daily output of either rum or alcohol, the initial cost of the distillery is much less than under prior practice, due to the fact that the sizes of buildings, fermenters, stills, mashing tanks, boilers, motors, engines, pumps, pipe lines, etc., are all greatly reduced. A 40 per cent savings in initial costs is a conservative figure.

(14) Operating costs are also greatly reduced for a given daily output of alcohol or rum, for less labor, power and steam will be necessary. The fact that a less volume of mash need be mashed up and distilled, with the high alcoholic concentrations attained, makes the process a very economical one.

(15) Old distilleries now operating on the ordinary mashing and fermenting methods may be made to increase their daily capacity, with a negligible initial expense, by as much as 35 to 50 per cent of their present producing power.

Data illustrating the beneficial effects of "thick mashing" will be found in Table I. The molasses used in obtaining this data is considered as of medium quality for rum and alcoholic fermentation purposes. Its greatest original drawbacks or defects consisted in an excessively high content of ash and gums.

TABLE I

*Composition and properties of blackstrap before and after "thick mashing" and of resulting "thick mash"*

| | Molasses before thick mashing | Thick mash | Molasses in thick mash |
|---|---|---|---|
| pH | 5.50 | 5.00 | 5.00 |
| Brix | 87.70 | 60.03 | 84.70 |
| Total solids | 84.30 | 56.16 | 81.03 |
| Total sugars (as invert) | 54.44 | 39.55 | 57.25 |
| Ash | 12.82 | 4.59 | 6.64 |
| Total non-sugars | 29.86 | 16.48 | 23.78 |
| Gums | 3.17 | 1.85 | 2.66 |
| Nitrogen (as $N_2$) | 1.00 | 0.80 | 1.15 |
| Phosphoric acid (as $P_2O_5$) | 0.17 | 0.24 | 0.34 |
| Potash (as $K_2O$) | 3.41 | 4.81 | 6.81 |
| Sp. gr. of thick mash: | | | |
| 1. Before settling | | 1.3372 | |
| 2. After settling | | 1.2658 | |
| Valuable ratios: | | | |
| T. sugars/T. non-sugars | 1.83 | 2.40 | 2.40 |
| T. sugars/ash | 4.25 | 8.62 | 8.62 |
| T. solids/T. sugars | 1.55 | 1.42 | 1.42 |

All percentages given are by weight.
"T" is used as the normal abbreviation for "total."

The data of Table I show that the raw material has been benefited as regards its suitability for alcoholic and rum fermentation. Among the pertinent results found in this comparison untreated molasses with the molasses in the "thick mash" are:

(1) An increase of 5.16 per cent in total sugars concentration by weight, over original value.

(2) A decrease of 20.36 per cent in total non-sugars.

(3) A decrease of 16.08 per cent in the gums.

(4) A decrease of 48.20 per cent in the ash content.

(5) The significant ratio of total sugars to ash has been raised from 4.25 to 8.62.

(6) The ratio, not less important, of total sugars to total non-sugars has been raised from 1.83 to 2.40.

(7) The concentration of water-soluble potash in molasses has been raised from 3.41 per cent to 6.81 per cent, corresponding to from 26.64 per cent to 37.29 per cent on weight of the respective ashes.

The results of fermentation tests, obtained during research work in the development of this process, will be found in Table II.

TABLE II

| | Fermentation Example No.— | | | | |
|---|---|---|---|---|---|
| | 1 | 2 | 3 | 4 | 5 |
| Setting temperature, °C | 29 | 29 | 29 | 29 | 29 |
| Initial pH | 5.15 | 5.15 | 5.15 | 5.10 | 5.25 |
| Final pH | 4.90 | 4.85 | 4.90 | 4.75 | 4.95 |
| Initial Brix | 20.90 | 21.40 | 21.85 | 22.40 | 22.90 |
| Brix before 1st increment | 10.70 | 11.60 | 12.10 | 13.00 | 13.90 |
| Brix after 1st increment | 16.00 | 17.10 | 18.00 | 19.60 | 21.00 |
| Brix before 2nd increment | 11.10 | 11.90 | 12.80 | 13.50 | 15.50 |
| Brix after 2nd increment | 14.50 | 15.10 | 16.70 | 18.00 | 19.40 |
| Final Brix | 9.00 | 9.50 | 10.00 | 10.60 | 10.90 |
| T. sugars/100 ml. mash | 17.70 | 18.40 | 19.26 | 20.50 | 21.63 |
| Duration of ferm., hours | 33:30 | 36:00 | 42:00 | 48:00 | 52:30 |
| Average ferm. temp., °C | 30.00 | 30.00 | 29.00 | 30.00 | 30.00 |
| Alcohol by volume | 10.65 | 10.88 | 11.18 | 11.37 | 11.80 |
| Alcoholic yield on T. sugars | 47.43 | 46.61 | 45.80 | 43.81 | 43.13 |
| Fermentation efficiency | 97.71 | 96.01 | 94.34 | 90.23 | 88.83 |

Average alcohol per cent by volume of all tests=11.17.
Average yield on sugars=45.36.
Average ferm. efficiency=93.43.

The recovered potash, from drying slops, still residue, etc., may be utilized for alkalizing reagent, thus further maintaining the purity of this alkali in the final residue, when it is ultimately withdrawn from the procedure.

It will be understood that the acidity of substantially pH 5.0 may vary within the tolerance of the particular yeast employed, and may vary in dependence upon the particular fermented molasses.

Suitable agents other than sulphuric acid may be employed for producing the desired degree of the thick mash and of the fermentation mash, having due regard to the cost and accessibility of these acid-producing material, and their availability for producing the desired purpose. The acid material should produce salts or esters which tend toward insolubility, so that these will precipitate during the sedimentation. It has been found that when phosphoric acid is employed as such, in mixture with sulphuric acid for example, the quantity should be restricted, since an excess of the phosphoric acid radical is often deleterious during fermentation.

Similarly, other suitable sources of nitrogen and phosphorus nutriment may be introduced, as full or partial substitutes for the ingredients stated: but here also care should be taken to employ cheap materials as available, and to avoid the excessive accumulation of non-volatile ash ingredients. Acid or neutral salts are therefore to be preferred to alkaline salts; acid salts having the advantage of acting as nutriment and also as acidifier.

In general, the process may be practiced in various ways within the scope of the appended claims.

I claim:

1. The method of fermenting blackstrap molasses for ethanol production, which comprises preparing a thick mash therefrom having a density of about 60 degrees Brix and a pH of substantially 5.0, effecting settling thereof for substantially six hours at a temperature of substantially 65 to 80 degrees C., separating the supernatant liquid and cooling to below 40 degrees C., diluting substantially half thereof with water for forming a thin fermentation mash having a density of 18 to 24 degrees Brix and containing lesser proportions than the original molasses of ash substances and soluble non-sugars relative to the sugars content, adjusting to substantially pH 5.0 and seeding with yeast, fermenting at substantially 28 to 30 degrees C., adding a major portion of the remaining thick mash after twelve hours and adjusting to substantially pH 5.0, fermenting at said temperature for six hours, adding the remainder of the thick mash and adjusting to substantially pH 5.0, and continuing the fermentation at said temperature.

2. The method of fermenting blackstrap molasses for ethanol production, which comprises preparing a thick mash therefrom having a density of about 60 degrees Brix and containing ammonia and phosphate yeast nutriment and having a pH of substantially 5.0, effecting settling thereof for substantially six hours at a temperature of substantially 65 to 80 degrees C., separating a first supernatant liquid, separating the deposited fraction and diluting to multiple volume, effecting a secondary settling and withdrawing a second supernatant liquid as a sweet water, introducing a part of the first supernatant liquid into the sweet water for forming a thin fermentation mash having a density of 18 to 24 degrees Brix, adjusting to substantially pH 5.0 and seeding with yeast, fermenting at 28 to 30 degrees C., adding a major portion of the remaining thick mash after twelve hours and adjusting the pH to substantially 5.0, fermenting at said temperature for six hours, adding the remainder of the thick mash and adjusting the pH to substantially 5.0, and continuing the fermentation at said temperature.

3. The method of fermenting blackstrap molasses for ethanol production, which comprises preparing a thick mash therefrom having a density of about 60 degrees Brix and adding nitrogen and phosphorus yeast nutriment and having a pH of substantially 5.0, effecting settling thereof until the sedimentary mass is reduced in volume to not exceeding one-fifth of the total mash, separating substantially 20 percent of the thick mash as a sediment portion, diluting the sediment portion with water and effecting a further settling as a secondary sediment, separating a supernatant sweet water from the secondary sediment, introducing substantially half of the supernatant liquid of the thick mash into the sweet water for forming a thin fermentation mash having a density of 18 to 24 degrees Brix, seeding with yeast, and successively adding increments from the remaining thick mash for maintaining the total sugar content of the fermenting thin mash at substantially 8 to 12 percent, and continuing the fermentation after all the thick mash has been introduced, the temperature during fermentation being maintained at 28 to 30 degrees C. and the acidity at substantially pH 5.0.

4. The method of fermenting blackstrap molasses for ethanol production, which includes the steps of preparing a thick mash therefrom having a density of about 55 to 63 degrees Brix and having a pH of substantially 0.5 less than that of the original molasses, effecting settling thereof at a temperature of 65 to 80 degrees C., separating the supernatant liquid, diluting the same with water to provide a fermentation mash having a density of substantially 18 to 24 degrees Brix, seeding with yeast, and from time to time adding further increments of the thick mash with agitation with each addition yielding a lesser density than the original thin mash density, while maintaining the temperature during seeding and fermentation at 28 to 30 degrees C. and the acidity of substantially pH 5.0.

5. The method of fermenting blackstrap molasses for ethanol production, which includes the steps of preparing a thick mash therefrom having a density of about 55 to 63 degrees Brix and having a pH of substantially 5.0, effecting settling thereof at a temperature of 65 to 80 degrees C., separating the supernatant liquid, diluting a portion thereof with water to provide a fermentation mash having a density of substantially 18 to 24 degrees Brix, seeding with yeast, and from time to time adding further increments of the thick mash with agitation, while maintaining the temperature during seeding and fermentation at 28 to 30 degrees C. and the acidity at substantially pH 5.0.

6. The method of fermenting blackstrap molasses for ethanol production, which comprises preparing a thick mash therefrom having a density of 55 to 63 degrees Brix and containing yeast nutriment and having a pH of substantially 5.0, effecting settling thereof at a temperature of 65 to 80 degrees C., separating the solids from supernatant liquid, introducing a portion of said thick mash into water to provide a fermentation mash having a density of substantially 18 to 24 degrees Brix, seeding with yeast, and adding further successively smaller increments of the thick mash at successively shorter intervals of time with agitation, while maintaining the fermentation temperature at 28 to 30 degrees C. and the acidity at substantially pH 5.0 during the course of fermentation.

7. The method of fermenting blackstrap molasses for ethanol production, which comprises preparing a thick mash therefrom having a density of 55 to 63 degrees Brix and containing yeast nutriment and having a pH of substantially 5.0, effecting settling thereof at a temperature of 65 to 80 degrees C., separating the supernatant liquid, introducing a portion thereof into water to provide a fermentation mash having a density of substantially 18 to 24 degrees Brix, seeding with yeast, and from time to time adding further successively smaller increments of the thick mash with agitation, while maintaining the fermentation temperature at 28 to 30 degrees C. and the acidity at substantially pH 5.0 during the course of fermentation.

8. The method of fermenting blackstrap molasses for ethanol production, which comprises preparing a thick mash therefrom having a density of 55 to 63 degrees Brix and having a pH of substantially 5.0, effecting a settling thereof, separating the supernatant liquid, introducing a portion thereof into water to provide a fermentation mash having a density of substantially 18 to 24 degrees Brix, seeding with yeast and adding one part of Turkey red oil per 16,000 parts of fermentation mash, and from time to time adding further increments of the thick mash with agitation, while maintaining the fermentation temperature at 28 to 30 degrees C. and the acidity at substantially pH 5.0 during the course of fermentation.

9. The method of fermenting blackstrap molasses for ethanol and potash production, which comprises preparing a thick mash therefrom having a density of about 55 to 63 degrees Brix, and a pH substantially 0.5 less than the original molasses and containing ammonium as a nutrient, effecting settling thereof whereby to deposit a sedimentary mass containing a high proportion of ash ingredients, gums and other non-sugars, separating the supernatant liquid and mixing with water to form a fermentation mash having a density of 18 to 24 degrees Brix, seeding with yeast and fermenting at 28 to 30 degrees C. and an acidity of substantially pH 5.0, successively introducing increments of thick mash into the fermentation mash as the density decreases to substantially 55 to 65 percent of the original Brix, distilling off ethanol from the fermented mash, and drying and calcining the residue for recovering a high potash product.

10. The method of fermenting blackstrap molasses for ethanol production, which comprises preparing a thick mash therefrom having a density of about 55 to 63 degrees Brix, effecting settling thereof whereby to deposit a sedimentary mass containing a high proportion of ash ingredients, gums and other non-sugars, separating the supernatant liquid and mixing with water to form a fermentation mash having a density of 18 to 24 degrees Brix, seeding with yeast and fermenting at 28 to 30 degrees C. and an acidity of substantially pH 5.0, and successively introducing increments of thick mash into the fermentation mash as the density decreases to 55 to 65 percent of the original Brix, each successive increment being of amount to produce a lesser density than the density existing immediately after adding the preceding increment.

RAFAEL ARROYO.